F. J. TRUBY.

AUTOMATIC TRUNKING SYSTEM.

APPLICATION FILED AUG. 30, 1916.

Reissued Nov. 15, 1921.

15,228.

3 SHEETS—SHEET 1.

Inventor
Franklin J. Truby
by Charles E. Bulkley
Attorney

F. J. TRUBY.
AUTOMATIC TRUNKING SYSTEM.
APPLICATION FILED AUG. 30, 1916.
Reissued Nov. 15, 1921.
15,228.
3 SHEETS—SHEET 2.
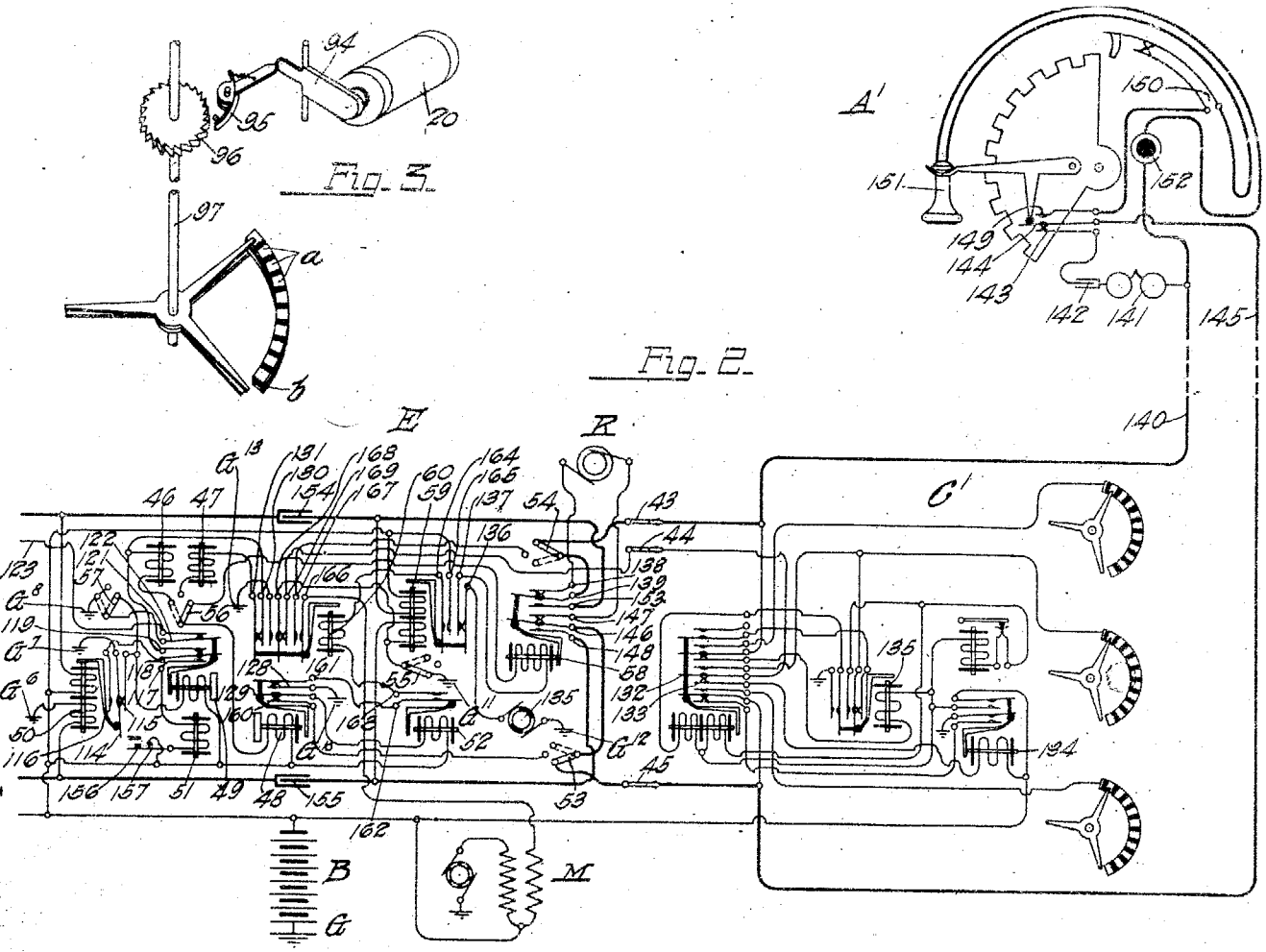
Inventor
Franklin J. Truby
Charles C. Bulkley
Attorney

F. J. TRUBY.

AUTOMATIC TRUNKING SYSTEM.

APPLICATION FILED AUG. 30, 1916.

Reissued Nov. 15, 1921. 15,228.

13 SHEETS—SHEET 3.

Inventor
Franklin J. Truby
by Charles C. Bulkley
Attorney

UNITED STATES PATENT OFFICE.

FRANKLIN J. TRUBY, OF CHICAGO, ILLINOIS, ASSIGNOR TO AUTOMATIC ELECTRIC COMPANY, OF CHICAGO, ILLINOIS, A CORPORATION OF ILLINOIS.

AUTOMATIC TRUNKING SYSTEM.

15,228. Specification of Reissued Letters Patent. Reissued Nov. 15, 1921.

Original No. 1,122,556, dated December 29, 1914, Serial No. 603,303, filed January 18, 1911. Application for reissue filed August 30, 1916. Serial No. 117,816.

*To all whom it may concern:*

Be it known that I, FRANKLIN J. TRUBY, a citizen of the United States of America, and resident of Chicago, Cook county, Illinois, have invented a certain new and useful Improvement in Automatic Trunking Systems, of which the following is a specification.

My invention relates to telephone exchange systems in general, but more particularly to systems in which automatic trunking switches are employed, and especially to systems in which a non-numerical trunking switch is allotted to each subscriber's telephone line. Previous to my invention these trunking switches, such as the said subscribers' line switches, have been operated in various ways. For example, these switches have been constructed to operate on the rotary principle, and provided with means whereby they are always restored to normal position or starting point after each call. In other cases these switches have been so constructed and operated that the trunk lines are selected ahead of the calls, each switch, while at rest, being in selective relation to the next idle trunk line, so that the first calling subscriber will get the preselected trunk line. The first method has been found to be objectionable for various reasons, as, for example, if several trunks are busy it requires some time for the line switch of the calling line to find an idle trunk, and during this operation the calling subscriber may begin calling the number of the called subscriber by transmitting electrical impulses in the usual and well known way, in which event the call would not go through in the proper manner. The second method has also been found to be more or less objectionable, in my judgment, as each time a subscriber calls he causes the actuation of all of the line switches of that group—that is to say, all the switches that are not in use—in order that another trunk may be selected for the next calling subscriber. In other words, and with this second method, each calling subscriber not only causes the actuation of his own switch, in order to obtain connection with the preselected trunk line, but also causes all of the idle line switches of that group to move off from said line and come to rest in selective relation to some other line.

The object of my invention is, therefore, the provision of an improved apparatus for and method of trunking which will not be open to any of the above objections, and which will give efficient trunking service with a minimum wear and tear, and with greater certainty of operation than heretofore.

To the foregoing and other useful ends I provide a trunking apparatus in which only one line switch operates when a subscriber makes a call—that is to say, only one in the group to which it belongs, and in which even this is often unnecessary, inasmuch as each switch is always in electrical connection with the trunk line which it last employed in extending the call, thereby making it possible for a subscriber to call again and get the same trunk line that he had for the previous call, providing in the interim the same has not been appropriated for use by some other subscriber, it being unnecessary, when this is possible, for the calling subscriber's switch to rotate from one trunk line to another in an effort to find one that is idle, as will hereinafter more fully appear.

In the accompanying drawings, Figures 1 and 2 taken together represent a complete circuit connection established between a calling substation A and a called substation A′, in a system embodying the principles of my invention. Fig. 1 shows a substation A to the line of which there is allotted a so-called rotary line switch C. The line switch C has access to a number of trunk lines, each of which leads to a selector similar to the selector switch shown at D. Fig. 2 represents diagrammatically a connector E, rotary line switch C′ and substation A′. The switch C′ and substation A′ are similar in all respects to the line switch C and substation A of Fig. 1. At B a battery is shown which is used for talking and operating purposes. The battery B has its positive terminal preferably grounded at G. At M a busy signaling machine is represented and at R a ringing current generator is shown.

Fig. 3 is a diagrammatic representation of the mechanism of the switch C.

Figure 1:
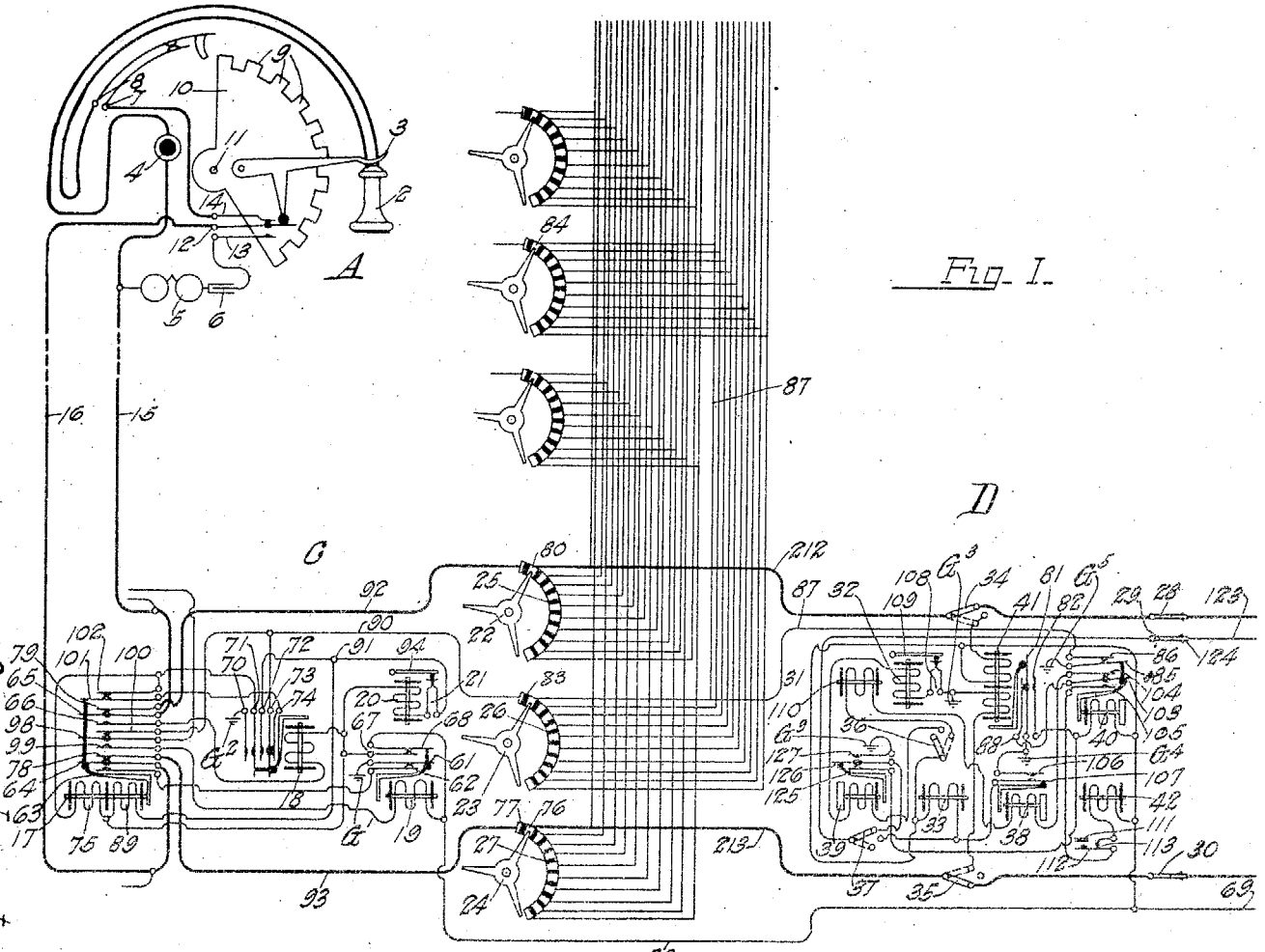

The substations used in a system embodying the principles of my invention may be of any suitable or approved type. Those in connection with which I have elected to illustrate my invention comprise at substation A, the receiver 2, switch hook 3, transmitter 4, ringers 5, condenser 6, impulse springs 7 and 8, which are forced out of engagement by the teeth 9 on the impulse wheel 10. The impulse wheel 10 is accurately fastened to a shaft 11, to which there is also secured a dial (not shown) provided with finger holes. When the switch hook 3 rises upon the removal of the receiver, the spring 12 is shifted out of engagement with the spring 13 and into engagement with the spring 14, whereby the circuit of the ringer 5 is broken, and the transmitter 4, receiver 2 and impulse springs 7 and 8 are bridged across the line conductors 15 and 16 in series.

The rotary line switch C comprises among other details, the double-wound relay 17, line relay 18, cut-off relay 19 and the motor magnet 20 with the interrupter springs 21. The switch also comprises a set of wipers 22, 23 and 24 which, by means of the magnet 20, are rotated over banks of contacts 25, 26 and 27 which consist of terminals of trunk lines leading to selectors such as the selector shown at D. The bank contacts of the various switches C are multipled as shown in Fig. 1, thus making a number of trunk lines common to a number of switches D. The banks consist of a number of individual segments *a* (Fig. 3) which form terminals of the trunks leading to the selectors D, and each also has a common segment *b* which is connected to a spring of the relays 17. The wipers are for the purpose of keeping one of the individual contacts *a* in electrical connection with the common segment *b*. Each of the wipers 22, 23 and 24 is provided with three arms, so that as one arm passes off the last contact another will pass onto the first one. Fig. 3 shows how the wipers 22, 23 and 24 are rotated by the magnet 20 through the medium of the armature 94, pawl 95, ratchet wheel 96 and shaft 97.

The selector D is of the general type disclosed in United States Letters Patent #815,321, granted March 13, 1906, to Keith, Erickson & Erickson, being slightly modified, however, to operate in conjunction with a two-wire system—that is, a system in which there is no ground connection used at the substation. The selector comprises the usual shaft (not shown) carrying the wipers 28, 29 and 30, which shaft has a vertical motion controlled by the vertical magnet 31 and a rotary motion controlled by the rotary magnet 32. The private magnet 33 operates the side switch carrying the wipers 34, 35, 36 and 37 in the usual and well-known manner, and is in turn controlled through the medium of the slow-acting relay 38. The switch is also provided with the slow-acting relays 39 and 40, double-wound relay 41 and release magnet 42. The selector D has access to trunk lines leading to connectors similar to the connector E shown in Fig. 2.

The connector shown at E is of the same general type as that disclosed in United States Letters Patent #815,176, granted March 13, 1906, to Keith, Erickson & Erickson. The connector, like the selector D, is provided with the usual shaft carrying the wipers 43, 44 and 45, the vertical motion of which shaft is controlled by the vertical magnet 46, and the rotary motion by the rotary magnet 47. It also comprises the slow-acting relays 48 and 49, double-wound line relay 50, release magnet 51 and private magnet 52, which latter controls a side switch carrying the wipers 53, 54, 55, 56 and 57, and in addition the connector is provided with a ringing relay 58, back-bridge relay 59 and the busy-locking relay 60.

A clearer understanding of my improved system may be obtained from an explanation of the operation by which one subscriber calls another. Assuming for example, that the subscriber at substation A desires to call the subscriber at substation A′, to which is allotted the line #220, the mode of operation is as follows: To call the number 220 the subscriber at substation A removes his receiver from the hook and operates his calling device once, in the well-known manner, for each digit. The removal of the receiver at the substation A closes an energizing circuit through the relay 18 of the switch C. This circuit extends from ground G′ through the springs 61 and 62 of the relay 19, thence through the springs 63 and 64 of the relay 17, conductor 16, springs 12 and 14, impulse springs 7 and 8, receiver 2, transmitter 4, conductor 15, springs 65 and 66, relay 18, springs 67 and 68 to the battery lead 69, thence through battery B to ground G. The relay 18, upon energizing, closes a circuit extending from ground $G^2$ through the springs 70 and 71, winding 75 of the relay 17, thence through the springs 67 and 68 to battery B. If the trunk upon which the wipers 22, 23 and 24 are standing is idle, the relay 75 will attract its armature, whereby the springs 64, 65 and 98 are shifted out of engagement with the springs 63, 66 and 99 and into engagement with the springs 78, 79 and 100, respectively, and the spring 101 is shifted into engagement with the spring 102. The engagement of the springs 64 and 65 with the springs 78 and 79 closes the line circuit to the selector D through the wipers 22 and 24. The extending of the line conductors to the selector D closes an energizing circuit through the double-wound line relay 41. This circuit extends from ground $G^3$ through the lower winding of the relay 41, side switch wiper 35, individual segment 76 of the bank 27, wiper 24, common segment 77, springs 78 and 64, thence to and through the substation A, back over the conductor 15, through the springs 65 and 79, common segment of the bank 25, wiper 22, individual segment 80, wiper 34 and upper winding of the relay 41 to the battery lead 69. The relay 41, upon energizing, closes a circuit through the slow relay 40. This circuit extends from ground $G^4$ through the springs 81 and 82 and the relay 40 to battery. The relay 40, upon energizing, puts a guarding ground potential on the private bank contact of the trunks leading to the selector D in the private banks of all of the individual switches that have access to the selector D. Thus, as soon as the relay 40 energizes there is (in this case) a ground potential on the contacts 83, 84, etc. This guarding circuit extends from ground $G^5$ through the springs 85 and 86 and the conductor 87 to the said private bank contacts. The energizing of the relay 40 also disconnects the impulse spring 88 from the release magnet 42, and connects the said impulse spring 88 through the relay 38 to the vertical magnet.

If the trunk upon which the wipers 22, 23 and 24 are standing had been in use when the subscriber at substation A removed the receiver, there would have been a guarding ground potential on the private bank contact, as described above, which would have caused the wipers to have been advanced off this trunk to an idle one. Upon the energization of the relay 18 a circuit would have been closed through the motor magnet 20 and winding 89 of the relay 17. This circuit extends from the ground at the private bank contact through the wiper 23, common segment of the bank 26, conductor 90, springs 73 and 72 to the point 91, thence one branch leads through the winding 89 and springs 67 and 68 to battery. From the point 91 another branch extends through the interrupter springs 21, motor magnet 20, thence through the springs 67 and 68 to battery. The current in the winding 89 opposes the current in the winding 75, thereby holding the relay 17 in a deënergized position, in which position the trunk lines 92 and 93 are open at the springs 79 and 78. The motor magnet 20, when its circuit is closed, attracts its armature 94. The pulling up of the armature 94 breaks the circuit of its own magnet and also operates, through the medium of the pawl 95 and ratchet wheel 96 (Fig. 3), to rotate the shaft 97 (upon which are secured the wipers 22, 23 and 24) one notch. As soon as the wipers are moved one step the wiper 23 leaves the grounded contact, breaking the circuit of the rotary magnet 20 and the winding 89 of the relay 17, if the next trunk is idle. If, however, the next trunk is busy, the wiper 23 finds another grounded contact, causing the magnet 20 to again operate in a manner similar to that of a buzzer to rotate the wipers past the busy trunk to an idle one. Of course, as soon as the circuit of the winding 89 of the relay 17 is broken by the wiper 23 passing off the last guarded contact, the relay 17 is operated by the current in the winding 75 in the same manner as explained when the wipers were resting on an idle trunk.

The shifting of the springs 64 and 65 from engagement with the springs 63 and 66 and into engagement with the springs 78 and 79 breaks the circuit of the relay 18, which immediately falls back. The relay 17 being slightly slow acting holds up until the relay 40 of the selector D pulls up, whereby ground potential is placed on the spring 73 over a circuit hereinabove traced. As the relay 18 deënergizes, a holding circuit for the relay 17 is established, said circuit extending from this ground potential through the springs 73 and 74, springs 101 and 102, winding 75 and springs 67 and 68 to battery. One branch also extends through the springs 100 and 98 to the private normal conductor leading to the private bank contact of the calling line in the banks of all of the connectors that have access to said lines, whereby the calling line is prevented from being called after it has started to set up a connection.

The foregoing is the operation of the central office mechanism upon the removal of the receiver from the hook at the calling substation. The subscriber at substation A now operates the calling device for the first digit of the desired number. The teeth 9 on the impulse wheel 10 operate, during the backward rotation of said impulse wheel, to force the spring 8 out of engagement with the spring 7, whereby the circuit through the relay 41 of the selector D is broken twice. The relay 41 deënergizes to close a circuit through the vertical magnet 31 in series with the relay 38. This circuit extends from ground $G^4$ through the springs 81 and 88, springs 103 and 104, slow relay 38, vertical magnet 31 and side switch wiper 36 to battery. The vertical magnet operates to raise the shaft and shaft wipers two steps to a point opposite the second levels of terminals of trunks leading to the connectors E. As soon as the vertical shaft is raised one or more steps the arm 111 allows the spring 112 to engage the spring 113, whereby one point in the circuit of the release magnet 42 is closed. The relay 40 being slow acting does not deënergize during the momentary interruption of its energizing current by the disengagement of the springs 81 and 82. Also, the relay 38, which was energized when the first impulse was sent through it, does not deënergize until a moment after the last impulse has been transmitted. In its energized position the relay 38 closes an energizing circuit through the private magnet 33. This circuit extends from ground $G^4$ through the springs 106 and 107 and the private magnet 33 to battery. The private magnet is thus held in an energized position until after the line at the substation A has been broken for the last time for the first digit, at which time the relay 38 deënergizes and breaks the private magnet circuit. The private magnet, upon deënergizing, allows the side switch wipers to pass to second position. The shifting of the wiper 36 from first to second position shifts the battery connection from the vertical to the rotary magnet. A circuit is now completed from ground $G^3$ through the interrupter springs 108, rotary magnet 32, slow relay 39 and side switch wiper 36 to battery. The rotary magnet energizes upon the closure of this circuit to rotate the shaft and wipers one step and onto the first contact of the second level, to press down the private magnet armature and to break its own circuit at the interrupter springs. The armature 109 falls back when the circuit of its magnet is broken. If the first contact is idle, the private armature will also fall back and allow the side switch wipers to pass to third position. If, however, the first contact is busy, the private wiper 29 will find the contact upon which it rests grounded in a manner which will be explained later, whereby a circuit is closed extending from said ground at the private bank contact through the private wiper 29, conductor 110, side switch wiper 37 (in second position) and private magnet 33 to battery. The private magnet energizes and holds its armature in an operated position, thereby locking the side switch in the second position. The rotary magnet again energizes to rotate the shaft and shaft wipers to the next bank contact. If the second trunk is idle, the side switch wipers will be allowed to pass to third position. If, however, the second trunk is busy, the operations above described will be repeated to rotate the wipers to the third contact, and so on until the private wiper strikes the terminal of a non-busy trunk, at which time the side switch wipers will pass to the third position. The passing of the wipers 34 and 35 to the third position completes the line from the calling substation to the connector E, thereby closing an energizing circuit through the relay 50 of the said connector. This circuit extends from ground $G^9$ through the lower winding of the relay 50, thence over the heavy conductors to and through the substation A and back over the heavy conductors, and through the upper winding of the relay 50 to battery. The relay 50, upon energizing, closes the circuit of the relay 49. This circuit extends from ground $G^7$ through the springs 114 and 115 and relay 49 to battery. The relay 49, upon energizing, shifts the spring 118 out of engagement with the spring 117 and into engagement with the spring 119, whereby the connection of the release magnet 51 with the impulse spring 116 is broken, and the impulse spring 116 is connected to the vertical magnet 46. The engagement of the springs 121 and 122 puts a holding ground back on the slow relay 40 of the selector D, and also puts a guarding potential on the private bank contacts of the seized trunk in the banks of all of the selectors D that have access to the connector E. The latter circuit extends from ground $G^8$ through the side switch wiper 57, springs 122 and 121 and conductor 123 to the above-mentioned private bank contacts. The former circuit extends over the same circuit to the private bank contact 124, thence through the private wiper 29, conductor 110, side switch wiper 37, springs 126 and 125 and relay 40 to battery. A short interval of time elapses, however, between the time the side switch wipers of the first selector pass to the third position and the time that the above-mentioned guarding potential is placed on the private bank contacts. The relay 39 is supplied with a ground spring 127 for the purpose of placing a guarding potential on the said private bank contact until the ground is supplied from the connector. The relay 39, which was energized in series with the rotary magnet, is slow acting; therefore it remains in an energized position for a moment after the side switch wipers have passed to the third position, whereby a ground is put on the private bank contacts over a circuit extending from ground $G^9$ through the springs 127 and 126, wiper 37, conductor 110 and private wiper 29 to the said bank contact. Of course, it is evident that the relay 39 must be slightly quicker in its action than the release relay 40, otherwise the switch would be released.

The central office mechanism is now in readiness to respond to the operations of the calling device for the second digit 2. As the subscriber at substation A operates the calling device for the second digit 2, the line is again opened twice. The relay 50 of the connector deënergizes twice to close a circuit through the vertical magnet 46 in series with the relay 48, the same as described for the selector D. The vertical magnet operates to raise the shaft and shaft wipers two steps to a position opposite the second level of bank contacts. The slow relay 48 deënergizes a moment after the last impulse has been sent through, and permits the private magnet 52 (which was energized over a circuit extending from ground $G^{10}$ through the springs 128 and 129 and magnet 52 to battery, while the relay 48 was energized) to deënergize, which in turn allows the side switch wipers to pass to second position. The wiper 56, in passing to the second position, shifts the battery connection from the vertical to the rotary magnet. The subscriber at substation A now operates the dial for the last digit 0. The line is opened ten times at the substation. The relay 50 deënergizes ten times to close the circuit of the rotary magnet 47 ten times. This circuit extends from ground $G^7$ through the springs 114 and 116, 118 and 119, 130 and 131, magnet 47, wiper 56 and relay 48 to battery. The rotary magnet energizes and deënergizes ten times to rotate the shaft and shaft wipers onto the contacts of the called line. The relay 48 does not deënergize until the last impulse has been transmitted. It then deënergizes and breaks the circuit of the private magnet 52, which in turn falls back and allows the side switch wipers to pass to third position. The wipers 53 and 54, in passing to third position, extend the conductors from the calling line to the called substation A′. The wiper 55, in passing to third position, puts a guarding potential on the private bank contact of the called line in the banks of all of the connectors that have access to the called line. This guarding potential extends from ground $G^{11}$ through the side switch wiper 55, springs 168 and 169 to the private wiper 44, thence to the contacts above mentioned. A circuit also extends from this ground at the private bank contact through the springs 132 and 133 and cut-off relay 134 to battery. The relay 134 energizes and disconnects both sides of the battery from the called line at the switch C′, thus making it impossible for the subscriber at substation A′ to call while there is a connection on his line. When the wiper 57 passes from second to third position it shifts the holding ground from the release relay 40 of the selector D from ground $G^8$ to ground $G^7$ through the springs 114 and 115. The wiper 56, in passing to third position, disconnects battery from the rotary magnet and closes the circuit of the ringing relay 58. The circuit through the relay 58 extends from ground $G^{12}$ through the interrupter 135, springs 136 and 137, relay 58, wiper 56 and relay 48 to battery. The ringing relay 58 energizes and disconnects the calling from the called line, and connects the ringing current generator R with the called line. A ringing current then flows from one brush of the generator R through the springs 138 and 139, side switch wiper 54, shaft wiper 43, line conductor 140, bells 141, condenser 142, springs 143 and 144, line 145, wipers 45 and 53 and springs 146 and 147 to the other brush of the generator R. The interruper in the ringer relay circuit allows the bells to be rung intermittently. Upon hearing the signal the subscriber at substation A′ removes the receiver from the hook, which thereupon, or as soon thereafter as the ringer relay deënergizes, closes a circuit through the back-bridge relay 59, thus supplying the called subscriber with talking battery current. This circuit extends from ground $G^{11}$ through the lower winding of the relay 59, springs 148 and 146, wipers 53 and 45, line 145, springs 144 and 149, impulse springs 150, receiver 151, transmitter 152, line 140, wipers 43 and 54, springs 139 and 153 and the upper winding of the relay 59 to battery. The relay 59 energizes over this circuit and operates to open the circuit of the ringer relay 58 at the springs 137 and 136. The subscribers at the two substations may now carry on an uninterrupted conversation until completed. The voice currents flow over the heavy conductors shown in the drawings through the condensers 154 and 155.

The release of the central office mechanism is initiated by the hanging up of the receiver at the calling substation. The replacing of the receiver on the hook at the calling substation opens the line by the disengagement of the springs 12 and 14. The relay 50 of the connector E falls back when the line is thus opened, and opens the circuit of the relay 40 of the selector D and relay 49 of the connector. The relay 49 falls back, whereby a circuit is closed through the release magnet 51. This circuit extends from ground $G^7$ through the springs 114 and 116, 118 and 117, magnet 51 and off normal springs 156 and 157 to battery. The switch mechanism is released upon the energization of the magnet, and the shaft, upon falling to its lowest position, again breaks the circuit of the release magnet.

The breaking of the holding circuit of the relay 40 of the selector D allows it to deënergize and close the circuit of the release magnet 42. This circuit extends from ground $G^4$ through the springs 81 and 88, springs 103 and 105, off normal springs 112 and 113 and magnet 42 to battery. Like the connector, the selector releases upon the energization of the magnet 42, and opens the off normal spring contacts when the shaft reaches the lowest position. The relay 40, upon deënergizing, also removes the guarding ground from the banks of the individual switches and the holding ground from the relay 17, which falls back and again connects the relay 18 to the battery. Thus the switches are put in readiness for another call.

If the called line had been busy when called from the substation A, the private wiper 46 of the connector E would have found the contact upon which it was rotated grounded in a manner hereinabove explained. This ground on the private bank contact would have maintained an energizing circuit through the private magnet 52 in series with the relay 59 after the relay 48 de-energized upon the completion of the last set of impulses. This circuit extends from the grounded bank contact through the wiper 44, springs 169 and 168, lower winding of the relay 59, ringer relay springs 148 and 146, wiper 53 (in second position), springs 160 and 129 and private magnet 52 to battery. The relay 59 is energized over this circuit, while the private magnet 52 remains in the energized position in which it was placed by the relay 48. The simultaneous energization of these two relays 59 and 52 closes an energizing circuit through the relay 60. This circuit extends from ground $G^{10}$ through the springs 128 and 161, springs 162 and 163, relay 60 and springs 164 and 165 to battery. The relay 60, upon energizing, opens the circuit of the rotary magnet and shifts the holding circuit of the magnet 52 and the relay 59 from ground at the private bank contact to ground $G^{13}$. This prevents the possibility of the side switch wipers passing to third position should the line become idle while the connector E is standing on it. The energization of the relay 60 also supplies the calling subscriber with a busy signal extending from battery through the secondary of the machine M, springs 166 and 167, wiper 54, springs 139 and 153, thence through the condenser 154 over the heavy conductor to and through the substation A, and back over the heavy conductor through the lower winding of the relay 50 to ground. Upon hearing the busy signal the subscriber at substation A replaces the receiver on the hook, which releases the switches in the same manner as above described.

Figure 4:
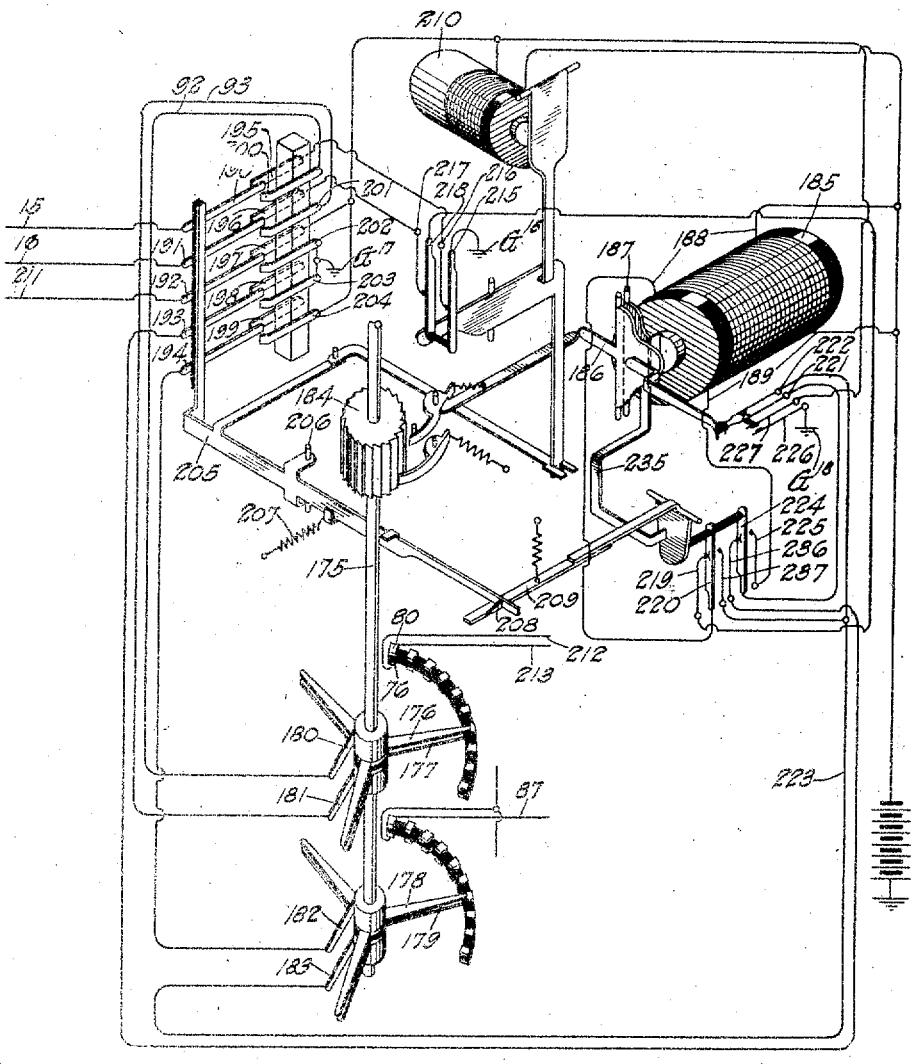
Fig. 4 is a modified form of the subscriber's individual switch.

Having described the operation of one form of individual switch employing the principles of my invention, I will now describe the modified form shown in Fig. 4. As shown in Fig. 4, the modified form of the switch comprises, among other details, a rotatable shaft 175 carrying four wipers 176, 177, 178 and 179, all insulated from each other and from the shaft 175. These wipers are each provided with three arms, so arranged that as one arm passes off the last contact, another arm will pass onto the first contact. Electrical connections are made with the wipers through the medium of the brushes 180, 181, 182 and 183. The shaft 175 is provided with a hub 184, which hub is provided with ratchet teeth through the medium of which the shaft may be rotated by the magnet 185 and its armature 186. The magnet 185 controls a second armature 187 and comprises two windings 188 and 189. When the winding 188 is energized it attracts the armature 187, but is not strong enough to operate the armature 186. The winding 189 operates both armatures 186 and 187. This form of the switch is also provided with a so-called side switch comprising the arms 190, 191, 192, 193 and 194, which arms are carried on an arm 205 pivoted at the point 206. The side switch arms are normally held in contact with the contact points 195, 196, 197, 198 and 199, respectively, against the tension of the spring 207 by the tooth 208 on the arm 209, which engages the end of the arm 205. When the armature 187 is attracted by the magnet 185, the arm 235, which is attached to said armature, tips down the arm 209, disengaging the tooth 208 from the end of the arm 205, and thereby allowing the side switch arms 190—194 to pass out of engagement with the contact points 191—199 and into engagement with the contact points 200—204. The side switch may be restored to normal position by the energization of the magnet 210, which forces the end of the arm 205 back into engagement with the escapement tooth 208. The magnet 210 is quick to energize but slow to deëenergize. The proper operation of this magnet may be obtained by securing a ring of copper around one end of the core. In Fig. 4 I have represented the line conductors leading to the individual switch, and the trunk conductors leading therefrom, the same as in Fig. 1. For instance, the line wires 15 and 16 are shown leading to the side switch arms 190 and 191, respectively. The private normal conductor 211 leads to the side switch arm 192. The trunk conductors 212 and 213 lead from the bank contacts 80 and 76 to the first selector D, the same as in Fig. 1. The third trunk conductor 87 leads to the first selector, just as in Fig. 1, but instead of being connected to the spring 86 on the relay 40 it is connected to the off normal spring 113. In fact, when the form of individual switch shown in Fig. 4 is used, the springs 86 and 85 of the relay 40 at the first selector may be dispensed with. The wiper 179 of the switch shown in Fig. 4 engages a fourth set of contacts which have no trunk line connections, but are simply multipled with the corresponding banks of all the individual switches which have access to the same group of trunk lines.

The operation of the switch in Fig. 4 is as follows: When the calling subscriber bridges his talking circuit across the line conductors 15 and 16, upon the removal of his receiver from the switch hook, a circuit is closed through the winding 188 of the magnet 185. This circuit extends from ground $G^{16}$ through the springs 215 and 216, contact point 195, side switch arm 190, line conductor 15, thence through the substation and back over the conductor 16, side switch arm 191, contact point 196, springs 217 and 218, 219 and 220 and winding 188 to battery B. The winding 188, upon energizing, attracts the armature 187. If the trunk line upon which the wipers of the switch are resting at that time is idle, the operation of the armature 187 simply causes the side switch to pass from first to second position. The movement of the side switch wipers 190 and 191 from first to second position disconnects the ground $G^{16}$ and the winding 188 from the line conductors 15 and 16, and extends said conductors through the conductors 92 and 93 and wipers 176 and 177 to a pair of trunk conductors 212 and 213 leading to a first selector. The side switch arm 192, in its operated position, extends a guarding ground potential over the conductor 211 to the connector private bank contacts of the calling line. The side switch arm 193, in its operated position, extends a guarding potential from ground $G^{17}$ through the contact point 203, arm 193, springs 236 and 224, interrupter springs 221 and 222, brush 183 and wiper 179 to the bank contact upon which it is resting, and thence to the corresponding contact in the banks of all the individual switches in the group. The side switch arm 194, in its operated position, connects the magnet 210 with the shaft wiper 178, and hence with the release trunk conductor 87 of the particular trunk line seized. The calling subscriber may now extend his call through the selector and connector switches in the manner previously described. If the wipers of the individual switch are standing on the contacts of a busy line when the receiver is removed from the switch hook, the wiper 179 is standing on a grounded contact, which ground is supplied through some other occupying switch in the manner explained above. In this case the attraction of the armature 187, upon the removal of the receiver, closes a circuit from the grounded contact upon which the wiper 179 is resting, through the brush 183, conductor 223, springs 222 and 221, 224 and 225 and winding 189 to battery B. The winding 189, upon energizing, attracts the armature 186, which operates to rotate the shaft 175 one step, to open the circuit of the winding 189 at the interrupter springs 221 and 222, and to close a circuit from ground $G^{18}$ through the springs 226 and 227 and slow magnet 210 to battery. The magnet 210, upon energizing, operates to disconnect the ground $G^{16}$ and winding 188 from the line and to prevent the side switch from passing to second position. By proper adjustment of the springs 224 and 225, and 226 and 227, the circuit of the magnet 210 may be closed before the side switch has left its normal position. When the circuit of the winding 189 is broken, the armature 186 falls back and allows the springs 221 and 222 to be again engaged. If the wiper 179 is still resting upon a grounded contact of a busy trunk when the springs 221 and 222 engage, the winding 189 will be energized again and the shaft rotated a second step. When the wiper 179 reaches a non-grounded contact of an idle trunk, the rotary magnet stops operating. The magnet 210, being slow acting remains in its operated position as long as the magnet 185 is operating to rotate the shaft. Soon after the armature 186 has fallen back for the last time the magnet 210 deënergizes and again connects the winding 188 to the line. The armature 187 is thereupon attracted and trips the side switch in the same manner as when the wipers are standing on the contacts of an idle trunk at the time the receiver is removed from the hook. During the time the armature 186 is operating to rotate the wipers to an idle trunk line, the winding 188 remains energized over a circuit extending from the grounded bank contacts of the busy trunks through the wiper 183, conductor 223, springs 237 and 220 and winding 188 to battery. This energization of the winding 188 causes the armature 187 to hold the springs 224 and 225 in contact, so that the circuit of the winding 189 may be closed each time the interrupter springs 221 and 222 come into engagement as described. The energization of the winding 188 is not strong enough to interfere with the operation of the armature 186.

When the calling subscriber hangs up his receiver upon the completion of the conversation, the selector and connector switches are released in the manner explained. Since the conductor 87 is connected to the spring 112 of the first selector, the magnet 210 of the individual switch will be energized in multiple with the release magnet 42 of the first selector over a circuit extending from ground $G^4$ to the spring 112, as previously traced, and thence through the conductor 87 (Fig. 4), wiper 178, brush 182, contact arm 194, contact point 204, and magnet 210 to battery. The magnet 210, upon energizing, forces the side switch of the individual switch back to its normal position, leaving the individual switch ready for use in another call.

It will be seen that with my improved construction and mode of operation each subscriber's line switch is always in electrical connection with some one of the different trunk lines leading therefrom. The connected trunk line, it will also be seen, is always the one last employed by the switch in extending a call. For example, suppose that one of the switches is in electrical connection with a trunk line over which conversation is being carried on between the calling and called subscribers. In such case the connected trunk line is, of course, the one last employed by the switch in extending the call. On the other hand, assume that the same switch is at rest, and that no talking circuit is being maintained thereby. Still, and in such case, the switch is in electrical connection with one of the trunk lines, and the connected trunk line is the one which was last employed by the switch in extending a calling connection. Invariably, therefore, as stated, each switch is normally and at all times connected with a trunk line which is the one last employed by it in extending a call. The switch thus controlled and operated is of such character that it always rotates in the same direction, and has no starting point or normal position. It simply remains each time in connection with the trunk line that was employed in extending the call. If in the interim that trunk line has been appropriated by some other subscriber, then when the first subscriber again calls, the switch will advance in a step-by-step manner to automatically select another trunk line. It is possible, however, in an exchange organized on the principle shown and described, for the subscribers to call many times without the necessity of operating their line switches in a step-by-step manner. In any event, and when a subscriber calls, only one line switch will ever operate, as in order to find another idle trunk it is not necessary for the switch to in any way actuate the other switches of the same group. Thus wear and tear is reduced to a minimum, and the certainty of operation is increased considerably, as the danger of a calling subscriber beginning to send in calling impulses before the line switch has found an idle trunk to a first selector is practically reduced to a minimum.

What I claim as my invention is:

1. In a telephone system, a line, a non-numerical trunking switch, trunk lines for talking purposes leading therefrom, said switch having line wipers normally in electrical engagement with one of said trunk lines, normally open connections between said line and line wipers, a relay having a pair of windings, means for energizing one of said windings to energize said relay to close said normally open connections when connection is made with an idle trunk, and means to energize both of said windings to prevent said relay from operating when said wipers contact with a busy trunk.

2. In a telephone system, a subscriber's line, a trunk-selecting switch individual thereto, a line relay therefor, a plurality of trunks associated with said switch, a test conductor for each trunk, automatic means for applying a potential to said test conductors, means responsive to such potential for moving said switch progressively over said trunks until a trunk is found without such potential on its test conductor, a cut-off relay operable only when said line is calling, means for energizing said cut-off relay as soon as an idle trunk is found, and means controlled by the energization of said cut-off relay to open the line relay circuit and connect the line with the line wipers of said switch.

3. In a telephone system, a subscriber's line, a trunk selecting switch individual thereto, line wipers for said switch normally disconnected from said line, a line relay therefor, a plurality of trunks associated with said switch, a test conductor for each trunk, automatic means for applying a potential to said test conductors, means responsive to such potential for moving said switch progressively over said trunks until a trunk is found without such potential on its test conductor, a cut-off relay operable only when said line is calling, and means controlled by said cut-off relay for opening the line relay circuit and for connecting the line and line wipers only when the switch makes a call.

4. In a telephone system, a subscriber's line, a trunk-selecting switch individual thereto, a line relay therefore, line wipers for said switch normally disconnected from the line, a plurality of trunks associated with said switch, a test conductor for each trunk, automatic means for applying a potential to said test conductors, means responsive to such potential for moving said switch progressively over said trunks until a trunk is found without such potential on its test conductor, and a relay in said switch for both opening the line relay circuit and for connecting the line and line wipers only when the switch makes a call.

5. In a telephone system, a subscriber's line, an automatic trunk-selecting switch individual thereto, a line relay therefor controllable over two sides of said line in series, a plurality of trunks associated with said switch, a test conductor for each trunk, automatc means for applying a potential to said test conductors, means responsive to such potential for moving said switch progressively over said trunks until a trunk is found without such potential on its test conductor, a cut-off relay, means for energizing said cut-off relay only when said line is calling, and means controlled by the energization of said cut-off relay to open the line relay circuit and connect the line with the line wipers of said switch.

6. In a telephone system, a subscriber's line, an automatic trunk-selecting switch individual thereto, line wipers for said switch normally disconnected from said line at the springs of only one relay, a line relay therefor controllable over two sides of said line in series, a plurality of trunks associated with said switch, a test conductor for each trunk, automatic means for applying a potential to said test conductor, means responsive to such potential for moving said switch progressively over said trunks until a trunk is found without such potential on its test conductor, a cut-off relay, and means controlled by said cut-off relay for opening the line relay circuit and for connecting the line and line wipers when the switch makes a call.

7. In a telephone system, a subscriber's line, an automatic trunk selecting switch individual thereto controllable over two sides of said line in series, line wipers for said switch normally disconnected from the line at the springs of only one relay, a plurality of trunks associated with said switch, a test conductor for each trunk, automatic means for applying a potential to said test conductors, means responsive to such potential for moving said switch progressively over said trunks until a trunk is found without such potential on its test conductor, and a relay in said switch for both opening the line relay circuit and for connecting the line and line wipers when the switch makes a call.

8. In a telephone system, a subscriber's line, a trunk selecting switch individual thereto, a line relay therefor controllable over two sides of said line in series, a plurality of trunks associated with said switch, a test conductor for each trunk, automatic means for applying a potential to said test conductors, means responsive to such potential for moving said switch progressively over said trunks until a trunk is found without such potential on its test conductor, a single normally open connection between said line and each line wiper, a cut-off relay, means for energizing said cut-off relay, and means controlled by the energization of said cut-off relay to open the line relay circuit and connect the line with the line wipers of said switch.

9. In a telephone system, a subscriber's line, a trunk selecting switch individual thereto, line wipers for said switch normally disconnected from said line at the springs of only one relay, a line relay therefor controllable over two sides of said line in series, a plurality of trunks associated with said switch, a test conductor for each trunk, automatic means for applying a potential to said test conductors, means responsive to such potential for moving said switch progressively over said trunks until a trunk is found without such potential on its test conductor, a cut-off relay, and means controlled by said cut-off relay for opening the line relay circuit and for connecting the line and line wipers when the switch makes a call.

10. In a telephone system, a subscriber's line, a trunk selecting switch individual thereto controllable over two sides of said line in series, line wipers for said switch normally disconnected from the line, a plurality of trunks associated with said switch, a test conductor for each trunk, automatic means for supplying a potential to said test conductors, means responsive to such potential for moving said switch progressively over said trunks until a trunk is found without such potential on its test conductor, and a relay in said switch for both opening the line relay circuit and for connecting the line and line wipers only when the switch makes a call.

11. In a telephone system, a subscriber's line, a non-numerical trunk-selecting switch individual thereto, a single normally open connection between said line and each line wiper, a line relay therefor, a cut-off relay, means for energizing said cut-off relay, means controlled by the energization of said cut-off relay to open the line relay circuit and connect the line with the line wipers of said switch, and trunk lines associated with the switch, the wipers of said switch normally engaging one of said trunk lines.

12. In a telephone system, a subscriber's line, a non-numerical trunk-selecting switch individual thereto, line wipers for said switch normally disconnected from said line at the springs of only one relay, a line relay therefor, a cut-off relay, means controlled by said cut-off relay for opening the line relay circuit and for connecting the line and line wipers when the switch makes a call, and trunk lines associated with the switch, the wipers of said switch normally engaging one of said trunk lines.

13. In a telephone system, a subscriber's line, a non-numerical trunk-selecting switch individual thereto, line wipers for said switch normally disconnected from the line, a relay in said switch for both opening the line relay circuit and for connecting the line and line wipers only when the switch makes a call, and trunk lines associated with the switch, the wipers of said switch normally engaging one of said trunk lines.

14. In a telephone system, a subscriber's line, an automatic trunk selecting switch individual thereto, a line relay therefor controllable over two sides of said line in series, a single normally open connection between said line and each line wiper, a cut-off relay, means for energizing said cut-off relay, means controlled by the energization of said cut-off relay to open the line relay circuit and connect the line with the line wipers of said switch, and trunk lines associated with the switch, the wipers of said switch normally engaging one of said trunk lines.

15. In a telephone system, a subscriber's line, an automatic trunk selecting switch individual thereto, line wipers for said switch normally disconnected from said line at the springs of only one relay, a line relay therefor controllable over two sides of said line in series, a cut-off relay, means controlled by said cut-off relay for opening the line relay circuit and for connecting the line and line wipers when the switch makes a call, and trunk lines associated with the switch, the wipers of said switch normally engaging one of said trunk lines.

16. In a telephone system, a subscriber's line, an automatic trunk selecting switch individual thereto controllable over two sides of said line in series, line wipers for said switch normally disconnected from the line at the springs of only one relay, said relay both opening the line relay circuit and connecting the line and line wipers when the switch makes a call, and trunk lines associated with the switch, the wipers of said switch normally engaging one of said trunk lines.

17. In a telephone system, a subscriber's line, a non-numerical trunk selecting switch individual thereto, a line relay therefor controllable over two sides of said line in series, a single normally open conne ion between said line and each line wiper, a cut-off relay, means for energizing said cut-off relay, means controlled by the energization of said cut-off relay to open the line relay circuit and connect the line with the line wipers of said switch, and trunk lines associated with the switch, the wipers of said switch normally engaging one of said trunk lines.

18. In a telephone system, a subscriber's line, a non-numerical trunk selecting switch individual thereto, line wipers for said switch, a single normally open connection between said line and each line wiper, a line relay therefor controllable over two sides of said line in series, a cut-off relay, means controlled by said cut-off relay for opening the line relay circuit and for connecting the line and line wipers when the switch makes a call, and trunk lines associated with the switch, the wipers of said switch normally engaging one of said trunk lines.

19. In a telephone system, a subscriber's line, a non-numerical trunk selecting switch individual thereto controllable over two sides of said line in series, line wipers for said switch normally disconnected from the line at the springs of only one relay in the switch, said relay both opening the line relay circuit and closing said normally open contacts when the switch makes a call, and trunk lines associated with the switch, the wipers of said switch normally engaging one of said trunk lines.

20. In a telephone system, a subscriber's line, a non-numerical trunk selecting switch individual thereto, a line relay therefor controlled over two sides of said line in series, a cut off relay, said relay energized only when the line is called, means controlled by the energization of said cut off relay to open circuit of the said line relay, trunk lines leading from said switch for extending a call, wipers for the said switch always in engagement with one of said trunk lines, said connected trunk line if idle, always the one employed by said switch in making a call.

21. In a telephone system, an automatic switch, means for operating said switch to establish a talking circuit, a relay for controlling the operation of said switch, a pair of windings for said relay, means for closing a circuit through both of said windings in multiple to start the operation of said switch, and means for opening the circuit of one of said windings to stop the operation of said switch.

22. In a telephone system, an automatic switch, trunk lines accessible to said switch, means for operating said switch to automatically select an idle one of said trunks, a relay for controlling the operation of said switch, a circuit for said relay, means for closing said circuit to start the selecting operation of said switch while the relay is de-energized and means for opening said circuit to energize said relay when an idle trunk line is reached to stop the operation of said switch.

23. In a telephone system, an automatic switch, means for operating said switch to establish a talking circuit, a relay for controlling the operation of said switch, a pair of windings for said relay, means for closing a circuit through both of said windings in multiple to start the operation of said switch, and means for opening the circuit of one of said windings to energize said relay to thereby stop the operation of said switch.

24. In a telephone system, a line, a non-numerical trunk selecting switch individual thereto, trunk lines leading therefrom, said switch having line wipers, always in electrical engagement with some one of said trunk lines, said connected trunk line i idle, always the one employed by the said sw ch in making a call, normally open connections between said line and line wipers, a double wound relay for said switch, means for closing a circuit of both windings in multiple to start said switch to rotate to select another of said trunk lines if said first trunk line is busy, and means for opening the circuit of one of said windings to stop the rotation of said switch and close said normally open connections.

25. In a telephone system, a line, a non-numerical switch for extending a connection from said line, a line relay for said switch energized over two sides of the line in series to operate the switch, wipers for said switch always in electrical engagement with some one of said trunk lines, said connected trunk line if idle, always the one employed by said switch in extending a call, normally open connections between said line and line wipers, a relay for closing said normally open connections, means for causing said switch to automatically select an idle one of said trunk lines, a cut off relay for said switch energized only when the line is called and operating to open the line relay circuit.

Signed by me at Chicago, Cook county, Illinois, this 25th day of August, 1916.

FRANKLIN J. TRUBY.